United States Patent [19]

Danielsen et al.

[11] 4,226,182

[45] Oct. 7, 1980

[54] SPRAYING

[75] Inventors: Kennet Danielsen, Vanloese; Torben Nielsen, Ballerup, both of Denmark

[73] Assignee: Thomas J. Lipton, Inc., Englewood Cliffs, N.J.

[21] Appl. No.: 20,139

[22] Filed: Mar. 13, 1979

[30] Foreign Application Priority Data

Mar. 13, 1978 [GB] United Kingdom ............... 9837/78

[51] Int. Cl.² ............................................... B41M 1/12
[52] U.S. Cl. ................................ 101/129; 101/127; 427/282; 427/421
[58] Field of Search ............... 427/282, 421; 101/114, 101/127, 129; 118/301

[56] References Cited

U.S. PATENT DOCUMENTS

| 1,508,669 | 9/1924 | Rabezzana | 101/129 |
| 3,147,142 | 9/1964 | Rudo | 101/129 |
| 4,031,268 | 6/1977 | Fairbairn | 427/282 |
| 4,102,734 | 7/1978 | Schiffman | 427/282 |

FOREIGN PATENT DOCUMENTS 815804 7/1959 United Kingdom.

Primary Examiner—Ronald H. Smith
Assistant Examiner—Janyce A. Bell
Attorney, Agent, or Firm—Brumbaugh, Graves, Donohue & Raymond

[57] ABSTRACT

A method of spraying a liquid to form a predetermined image on an article in which the liquid is sprayed through a pair of stencils spaced apart preferably 2 mm to 8 mm and each having apertures corresponding to the shape and size of the desired image. The definition of the image is improved and surplus liquid cannot reach the article.

3 Claims, 1 Drawing Figure

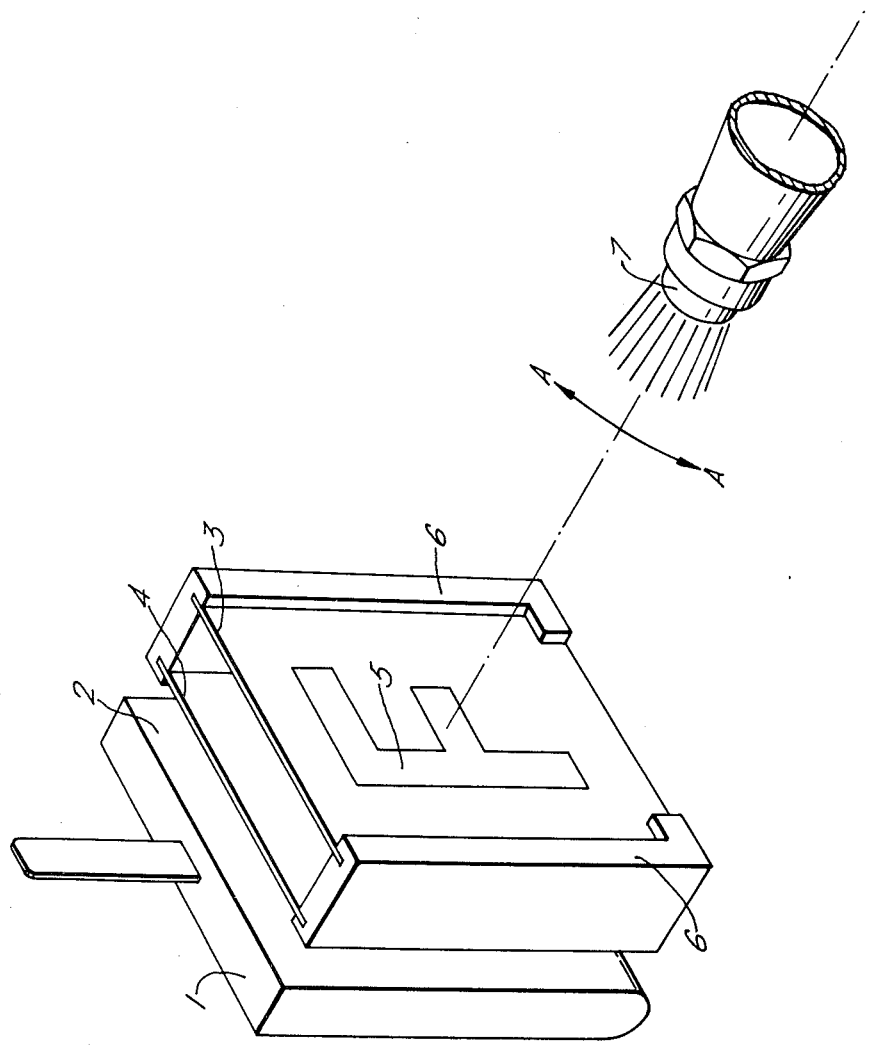

SPRAYING

This invention relates to improvements in or relating to the spraying of liquid and particularly to the forming of predetermined images on an article by spraying the liquid.

When it is desired to apply a liquid such as paint, ink or any other liquid colourant onto an article in a predetermined image it is conveniently effected by producing the desired image as an aperture in a thin plate to form a stencil, lying the stencil onto the surface of the article with the aperture in the position where the image is to be reproduced, and applying the liquid by brushing, spraying or any other suitable means through the stencil to the article whilst maintaining the stencil in position. Where the same stencil is to be used repeatedly to produce the same image on a number of articles the stencil has to be repeatedly cleaned to prevent surplus liquid applied to the stencil from reaching the article as it is brought into contact with the stencil, which surplus liquid can mar the article.

To avoid the need for repeated cleaning of the stencil the stencil can be spaced parallel with the surface of the article on which the image is to be reproduced but spaced a short distance therefrom to avoid surplus liquid contacting the article. When this is done the liquid is applied by spraying but the definition of the image is spoilt by blurring at the edges.

According to the present invention there is provided a method of spraying a liquid to form a predetermined image on an article comprising positioning the article with the surface to receive the image substantially vertical and parallel with and spaced away from the adjacent one of a pair of stencils each apertured in the shape and size of the image to be reproduced, said pair of stencils being spaced apart in parallel planes, and spraying the liquid onto the article through the pair of stencils.

It has been found that by using a pair of stencils each having the same shape and size of aperture corresponding to that of the image to be reproduced the definition of the image is markedly improved and surplus liquid cannot reach the article.

The distance by which the stencil adjacent the article is spaced therefrom depends on the droplet size formed by the liquid being sprayed but should be a distance of at least 2 mm and preferably 4 to 6 mm. Similarly the pair of stencils should be spaced apart by a distance of between 2 mm and 8 mm preferably 4 mm.

The stencils can be surface treated to promote surplus liquid flowing over the substantially vertical surfaces thereof, e.g. by being coated with a covering of a suitable oil.

To minimise sprayed liquid hitting an edge of the aperture and being deflected onto the article outside of the predetermined image area the thickness of the stencils should preferably be no thicker than 1.5 mm and preferably less than 1 mm to minimise the width of the horizontal edges of the aperture.

A uniform intensity of the liquid over the whole area of the image may be more readily achieved if the direction of spraying is varied during the spraying of each article.

The invention will now be more particularly described with reference to the accompanying FIGURE which shows a diagrammatic perspective view of an arrangement for producing a predetermined image on an ice cream.

The ice cream 1 is arranged with its surface 2 on which the image is to be produced in a substantially vertical plane. Stencils 3 and 4 each having the same shape and size of aperture 5 are mounted in a suitable frame 6 so that they are parallel both with each other and the surface 2 of the article. The apertures 5 are aligned so that a line contacting like portions of each aperture is at right angles to the planes of the stencils. A spray nozzle 7 of a suitable spray device for the liquid to be used is disposed a short distance away from the stencils with the central axis of the nozzle substantially aligned with the mid point of the aperture. Means (not shown) are provided for moving the spray nozzle through a small arc as indicated by the arrows A—A in a vertical plane.

In this example the liquid to be sprayed is an edible colour solution which solidifies on contacting the ice cream. The stencils are each 0.6 mm thick and spaced 4 mm apart and the surface 2 of the article is 4 mm from the adjacent stencil. The viscosity of the colour solution, the spraying pressure, the distance of the spray nozzle from the stencils as well as the type of nozzle used are all variants which can be chosen by one skilled in the spraying art to be suitable for the particular liquid to be sprayed and the size of the image to be reproduced. Similarly the distance, direction and speed of movement of the spraying nozzle during spraying is also correlated to the nature of the liquid and size of the image to be reproduced.

What we claim is:

1. A method of spraying a liquid to form an image on an article comprising positioning the article with the surface to receive the image substantially vertical and parallel with and spaced away from the adjacent one of a pair of stencils by a distance of 2 to 6 mm, each apertured in the shape and size of the image to be reproduced, said pair of stencils being spaced apart in parallel planes by a distance of between 2 and 8 mm, and spraying the liquid onto the article through the pair of stencils.

2. A method according to claim 1 in which the stencils are each less than 1.5 mm thick.

3. A method according to claim 1 in which the direction of spraying is varied during the spraying of each article.

* * * * *